United States Patent
Xing et al.

[11] Patent Number: 6,048,646
[45] Date of Patent: Apr. 11, 2000

[54] METHOD FOR TREATING COPPER CURRENT COLLECTORS FOR LI-ION AND/ OR LI-ION POLYMER BATTERIES

[75] Inventors: Xuekun Xing, Richmond Heights; Wan Jun Fang, Mentor; James R. Winchester, III, Cleveland Heights, all of Ohio

[73] Assignee: GA-TEK Inc., Eastlake, Ohio

[21] Appl. No.: 09/120,063

[22] Filed: Jul. 21, 1998

[51] Int. Cl.$^7$ .............................. H01M 4/64; H01M 4/72
[52] U.S. Cl. ............................................ 429/233; 429/241
[58] Field of Search ............................ 429/94, 157, 233, 429/241

[56] References Cited

U.S. PATENT DOCUMENTS

| | | |
|---|---|---|
| 4,162,202 | 7/1979 | Dey . |
| 4,411,825 | 10/1983 | Domeniconi ............................ 252/503 |
| 4,549,941 | 10/1985 | Parthasarathi et al. . |
| 5,187,033 | 2/1993 | Koshiba . |
| 5,415,948 | 5/1995 | Gauthier ..................................... 429/62 |
| 5,436,091 | 7/1995 | Shackle et al. . |
| 5,518,839 | 5/1996 | Lsen ......................................... 429/192 |
| 5,532,086 | 7/1996 | Thibault et al. . |
| 5,547,782 | 8/1996 | Dasgupta et al. . |
| 5,578,399 | 11/1996 | Lsen ......................................... 429/245 |
| 5,582,935 | 12/1996 | Dasgupta et al. . |
| 5,616,437 | 4/1997 | Gao . |
| 5,665,491 | 9/1997 | Tomiyama et al. . |
| 5,721,068 | 2/1998 | West et al. . |

*Primary Examiner*—Maria Nuzzolillo
*Assistant Examiner*—Mark Ruthkosky
*Attorney, Agent, or Firm*—Mark Kusner; Michael A. Centanni

[57] ABSTRACT

A method of treating a copper current collector (copper mesh and/or copper foil) for use in Li-ion and/or Li-ion polymer batteries, comprising the steps of: positioning a copper current collector within an electrolytic solution adjacent an anode plate, the electrolytic solution comprised of about 2 to about 25 grams/liter of $Cu^{+2}$, and about 30 to about 100 grams/liter of $H_2SO_4$; energizing the system to have a predetermined current density; maintaining the current density of the system for about 0.5 to about 3.0 minutes; and removing the copper current collector from the electrolyte solution and rinsing the same.

8 Claims, No Drawings

METHOD FOR TREATING COPPER CURRENT COLLECTORS FOR LI-ION AND/OR LI-ION POLYMER BATTERIES

FIELD OF THE INVENTION

The present invention relates generally to Li-ion and/or Li-ion polymer batteries, and more particularly, to a method for treating copper current collectors used therein.

BACKGROUND OF THE INVENTION

Li-ion and/or Li-ion polymer cells typically include a first conductive terminal (conventionally referred to as a "current collector"), an anode adjacent the current collector, a separator layer, a cathode layer and a second current collector adjacent the cathode layer. The anode current collectors are typically formed of copper foil or copper mesh and are disposed within the cell to be in contact with the anode layer. The surface contact resistance and surface adhesion between the copper current collectors and the anode layer play a significant role on the performance of the Li-ion and/or Li-ion polymer cell.

The present invention provides a surface treatment for copper current collectors that modifies the surface properties thereof to improve battery performance.

SUMMARY OF THE INVENTION

In accordance with the present invention, there is provided a method of treating a copper current collector for use in a Li-ion and/or Li-ion polymer cell comprising the steps of:

a) positioning a copper mesh current collector within an electrolyte solution adjacent an anode plate, the electrolyte solution comprised of about 2 to about 25 grams/liter of $Cu^{+2}$ ions and about 30 to about 100 grams/liter of $H_2SO_4$;

b) connecting the copper current collector to a cathodic source;

c) energizing the system to have an apparent current density of about 5 to about 20 amperes per square foot;

d) maintaining the system at the current density for about 0.5 to about 3.0 minutes;

e) removing the copper current collector from the electrolyte solution; and f) rinsing the copper current collector with water.

In accordance with another aspect of the present invention, there is provided a method for treating copper current collectors as described above, further comprising the steps of:

g) immersing the copper current collector in an aqueous solution containing about 1 to about 10 grams/liter of $CrO_3$;

h) maintaining the copper current collector in the aqueous solution for about 0.5 to about 1.0 minute;

i) removing the copper current collector from the aqueous solution; and j) rinsing the copper current collector with water.

In accordance with another aspect of the present invention, there is provided a method of treating a copper foil to be formed into copper mesh or directly used as a current collector for use in a Li-ion and/or Li-ion polymer battery, comprising the steps of:

positioning a copper foil within an electrolyte solution adjacent an anode plate, said electrolyte solution comprised of:
about 2 to about 25 grams/liter of $Cu^{+2}$; and
about 30 to about 100 grams/liter of $H_2SO_4$;

making said copper foil a cathode;

energizing said system to have a current density of about 5 to about 20 amperes per square foot;

maintaining said system at said current density for about 0.5 to about 3.0 minutes;

removing said copper foil from said electrolyte solution; and rinsing said copper foil with water.

It is an object of the present invention to provide copper current collectors for use in Li-ion and/or Li-ion polymer cells.

It is another object of the present invention to provide copper current collectors as described above having improved surface characteristics that will improve the surface adhesion to the anode layer.

A still further object of the present invention is to provide a method of treating copper mesh current collectors or copper foil to be formed into copper mesh or directly used as current collectors to improve the conductive properties thereof.

These and other objects and advantages will become apparent from the following description of a preferred embodiment of the invention.

DETAILED DESCRIPTION OF PREFERRED EMBODIMENT

Broadly stated, the present invention relates to a method for treating a copper current collector, or a copper foil that is to be later formed into a copper mesh or directly used as a current collector, to improve the surface characteristics thereof, particularly the surface adhesion between a copper current collector and an anode film typically found in a lithium ion and/or lithium ion polymer battery.

As indicated above, good adhesion between the current collector and an electrode film can enhance the performance of batteries in terms of cycling life, rate and self-discharge. The present invention basically provides a surface treatment for copper mesh or copper foil current collectors that significantly modifies the surface properties of copper, and improves the adhesion between a copper current collector and an electrode film, and thus improves the overall battery performance for Li-ion and/or Li-ion polymer batteries.

In accordance with the present invention, a thin layer of fresh copper is deposited on a copper mesh or copper foil through an electrochemical process. In the electrochemical process, the copper foil or copper mesh to be treated is made cathodic. The copper mesh or copper foil is immersed into an electrolytic solution adjacent to anode plates. The anode plates are preferably formed of a metal insoluble in the solution, such as titanium, stainless steel and other suitable anode materials.

The electrolytic solution is comprised of the following components:

$Cu^{+2}$: 2 to 25 grams/liter
$H_2SO_4$: 30 to 100 grams/liter.

The electrolytic solution is preferably at or about room temperature, although it would be appreciated from a further reading of the specification that the treating process may be performed at higher temperatures. In a preferred embodiment, the electrolytic solution is stagnant although it may be agitated or replenished through conventionally known means.

In accordance with the present invention, the copper to be treated is immersed in the electrolytic solution adjacent the anode plate. The system is energized to have an apparent current density of about 5 to about 25 amperes per square foot, and more preferably to have a current density of about 10 to about 15 amperes per square foot and most preferably of about 12 amperes per square foot. The copper is exposed to this level of energization for about 0.5 to about 3.0 minutes, and more preferably for about 0.5 to about 1.0 minute.

Following the electroplating process, the treated copper is removed from the electrolytic bath and rinsed with water. The water may be applied by spray nozzles or the copper current collector may be immersed in a water filled rinse tank.

In accordance with another aspect of the present invention, following the rinsing with water, the treated copper is immersed in an aqueous solution containing about 1 to about 10 grams/liter of chromic acid ($CrO_3$). The treated copper is immersed in the aqueous chromic acid solution for about 0.5 to about 1.0 minute. The copper is then removed from the chromic acid aqueous solution and again rinsed with water to remove any residue.

It has been found that by treating copper current collectors as heretofore described prior to their assembly in a Li-ion and/or Li-ion polymer cell improves the overall operating characteristics of the cell.

Tests are performed to determine the improved characteristics of treated copper current collectors versus the same copper current collectors without treatment. The test is performed with like copper current collectors. The results of the tests are set forth below in Table I.

TABLE I

TEST RESULTS

|  | Batteries with untreated copper collectors | Batteries with treated copper collectors |
|---|---|---|
| Peel strength of anode film on copper collectors (lbs/in) | ~0.1 | ~0.95 |
| Battery Impedance (mOhms) | 500–800 | 200–300 |
| Battery Rate Performance (%)* | 82–88 | 91–92 |

*Utilization is determined at 1 c rate.

Test results show that the peel strength (an indication of the surface adhesion) between the anode film and the copper current collectors significantly increased with the treated copper current collectors. As shown in Table I, the peel strength for treated copper current collectors is about 9 times that of like copper current collectors that are untreated.

Further, it is found that batteries formed with treated copper current collectors and untreated copper current collectors exhibit significantly different properties. Batteries manufactured with treated copper current collectors exhibit a significant reduction in the impedance as compared to batteries with untreated copper current collectors. Further, the battery rate performance (an indication of the efficiency of the battery) shows a significant improvement using the treated copper current collectors as compared to batteries using untreated copper current collectors.

The present invention thus provides a method of treating copper current collectors to improve the surface adhesion of the copper current collectors with the anode layer. Basically, the aforementioned treatment increases the surface area and surface roughness of the current collector. The increased surface area and roughness facilitates a better mechanical interlocking between the current collector and electrode film. This improved physical contact lowers the impedance of collector-to-film interface, as illustrated in TABLE I. On the other hand, this treatment may create a new fresh electrodeposited copper surface layer. This surface layer may possess some physical-chemical properties different from the original copper substrate. This can also contribute to the improvement of the adhesion between the copper collector and anode films.

The present invention has been described with respect to a preferred method of treating copper mesh current collectors. As indicated above, such treatment may be applied to a copper foil before such foil is formed into a mesh current collector or directly used as current collectors. Such modifications and alterations will become apparent to those skilled in the art after a reading the present specification. It is intended that all such modifications and alterations be included insofar as they come within the scope of the invention as claimed or the equivalents thereof.

Having described the invention, the following is claimed:

1. A method of treating a copper mesh current collector for use in Li-ion and/or Li-ion polymer batteries, comprising the steps of:

positioning a copper mesh current collector within an electrolyte solution adjacent an anode plate, said electrolyte solution comprised of:
about 2 to about 25 grams/liter of $Cu^{+2}$; and
about 30 to about 100 grams/liter of $H_2SO_4$;
making said copper mesh current collector a cathode;
energizing said system to have a current density of about 5 to about 20 amperes per square foot;
maintaining said system at said current density for about 0.5 to about 3.0 minutes;
removing said copper mesh current collector from said electrolyte solution; and
rinsing said copper mesh current collector with water.

2. A method as defined in claim 1, further comprising the steps of:

immersing said copper mesh current collector in an aqueous solution containing about 1 to about 10 grams/liter of $CrO_3$;
maintaining said copper mesh current collector in said aqueous solution for about 0.5 to about 1.0 minute;
removing said copper mesh current collector from said aqueous solution; and
rinsing said copper mesh current collector with water.

3. A method as defined in claim 1, wherein said electrolyte solution is at room temperature.

4. A method as defined in claim 1, wherein said electrolyte solution is agitated.

5. A method as defined in claim 2, wherein said electrolyte solution is agitated and is at a temperature above room temperature.

6. A method of treating a copper foil to be used in forming a mesh current collector and/or directly used as a current collector for use in Li-ion and/or Li-ion polymer batteries, comprising the steps of:

positioning a copper foil within an electrolyte solution adjacent an anode plate, said electrolyte solution comprised of:
about 2 to about 25 grams/liter of $Cu^{+2}$; and
about 30 to about 100 grams/liter of $H_2SO_4$;
making said copper foil a cathode;
energizing said system to have a current density of about 5 to about 20 amperes per square foot;

maintaining said system at said current density for about 0.5 to about 3.0 minutes;

removing said copper foil from said electrolyte solution; and rinsing said copper foil with water.

7. A method as defined in claim 6, further comprising the steps of:

immersing said copper foil in an aqueous solution containing about 1 to about 10 grams/liter of $CrO_3$;

maintaining said copper foil in said aqueous solution for about 0.5 to about 1.0 minute;

removing said copper foil from said aqueous solution; and rinsing said copper foil with water.

8. A method as defined in claim 6, wherein said copper foil is formed into a mesh current collector and/or directly used as a current collector for Li-ion and/or Li-ion polymer batteries.

* * * * *